United States Patent
Graham

(10) Patent No.: US 10,451,892 B2
(45) Date of Patent: Oct. 22, 2019

(54) ACTIVE ISOLATION FOR SEEKER OPTICS

(71) Applicant: Rosemount Aerospace Inc., Burnsville, MN (US)

(72) Inventor: Jason Graham, Prior Lake, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 15/709,852

(22) Filed: Sep. 20, 2017

(65) Prior Publication Data

US 2019/0086684 A1    Mar. 21, 2019

(51) Int. Cl.
| G02B 26/08 | (2006.01) |
| G02B 27/64 | (2006.01) |
| G02B 13/00 | (2006.01) |
| F16F 15/00 | (2006.01) |
| F41G 7/22  | (2006.01) |
| G02B 7/02  | (2006.01) |

(52) U.S. Cl.
CPC .......... G02B 27/646 (2013.01); F16F 15/005 (2013.01); F41G 7/2293 (2013.01); G02B 7/021 (2013.01); G02B 13/0045 (2013.01)

(58) Field of Classification Search
CPC .......................... G02B 27/646; G02B 13/0045
USPC ...................................................... 359/217.3
See application file for complete search history.

(56) References Cited

U.S. PATENT DOCUMENTS

| 5,485,053 A | 1/1996 | Baz |
| 6,700,715 B2 | 3/2004 | Sorg et al. |
| 7,002,139 B2 | 2/2006 | Stallard et al. |
| 7,145,124 B2 | 12/2006 | Garrood et al. |
| 8,049,148 B2 | 11/2011 | Facciano et al. |
| 8,567,969 B2 | 10/2013 | Thomas et al. |
| 2005/0258338 A1 | 11/2005 | Baumgart et al. |
| 2008/0217465 A1* | 9/2008 | Facciano ................. F42B 10/00 244/3.1 |
| 2008/0302905 A1* | 12/2008 | Johnson ................ F41G 7/2253 244/3.16 |
| 2011/0226955 A1 | 9/2011 | Luty et al. |
| 2012/0138728 A1 | 6/2012 | Brunton et al. |
| 2014/0008531 A1* | 1/2014 | Furuhashi ............. H01J 49/067 250/287 |

FOREIGN PATENT DOCUMENTS

| CN | 204154187 U | 2/2015 |
| EP | 3205972 A1 | 8/2017 |
| JP | H08152661 A | 6/1996 |
| WO | 2016092081 A1 | 6/2016 |

OTHER PUBLICATIONS

Extended European Search Report dated Mar. 11, 2019, received for corresponding European Application No. 18194191.5.
United States Statutory Invention Registration No. USH2265H, by Fouse et al., published on Dec. 6, 2011.

* cited by examiner

Primary Examiner — Euncha P Cherry
(74) Attorney, Agent, or Firm — Kinney & Lange, P.A.

(57) ABSTRACT

An optical system configured to counteract vibrations due to a munitions launch includes a cylindrical optical lens stack. The system also includes an accelerometer attached to the lens stack and connected to a control system and power supply. The system further includes a mechanical actuator attached to the lens stack and connected to a control system and power supply. The mechanical actuator is a piezoelectric actuator.

20 Claims, 2 Drawing Sheets

ACTIVE ISOLATION FOR SEEKER OPTICS

BACKGROUND

The disclosed subject matter relates generally to imaging apparatus and methods, and more specifically to optical elements usable in air vehicles and munitions.

Quality imaging optical components are made from crystalline and glass materials, which are very brittle and sensitive to stress concentrations and tensile stresses. Mounting elements made from these materials for survival under high launch and impact acceleration and forces such as unmanned air vehicles, rockets, and gun launches can be very challenging due to catastrophic failure modes of these brittle materials. Any existing or new stress concentration can cause a fracture initiation point and the optical element can be prone to shattering.

Methods are needed to counter internal stresses resulting from shock or other impact events in imaging optical systems.

SUMMARY

An optical system configured to minimize vibration includes a cylindrical optical lens stack, and an accelerometer attached to the lens stack and electrically connected to a control system and power supply. The system further includes a mechanical actuator attached to the lens stack and electrically connected to a control system and power supply. The mechanical actuator is a piezoelectric actuator.

In an embodiment, a method of forming an optical system configured to minimize vibration includes forming a multi-lens cylindrical optical lens stack in a cylindrical holder and inserting the lens stack in a cylindrical mechanical actuator attached to a control system and power supply. The method further includes attaching an accelerometer to the optical lens stack and electrically connecting the mechanical actuator and an accelerometer to a control system and power supply.

DETAILED DESCRIPTION

Seeker optical systems in gun launched weaponry need to be hardened against setback and set forward shocks caused by launch and flight accelerations in order for the system to function correctly. Most, if not all, optical elements in systems across the optical spectrum need protection against shock induced fracture. The system disclosed herein addresses this issue.

Figure 1:
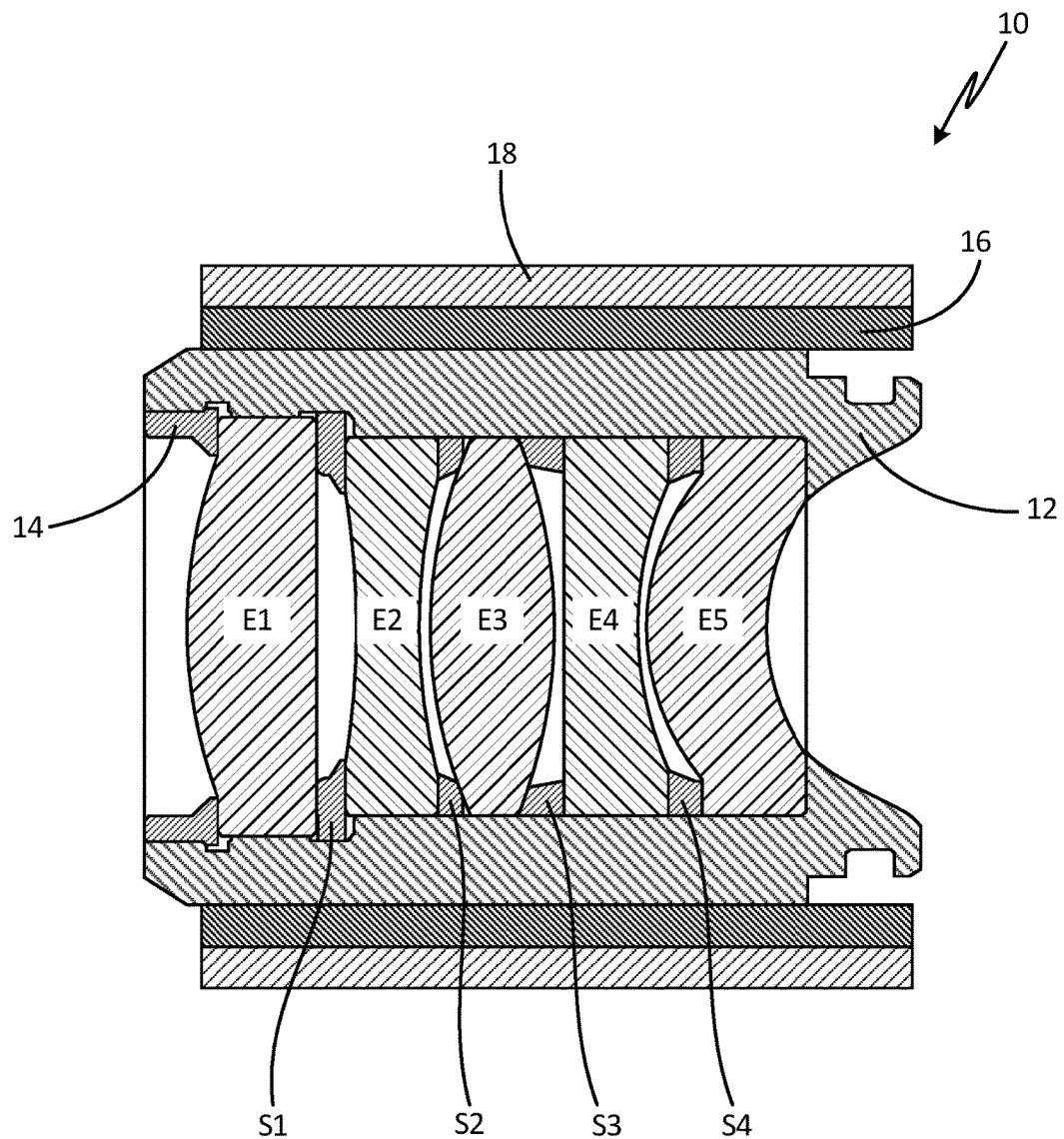
FIG. 1 is a schematic view of a cross section of a seeker lens stack according to the present disclosure.

FIG. 1 is a schematic view of a cross section of an optical lens stack according to the present disclosure. Optical lens stack 10 includes cylindrical optical elements E1-E5 and spacers S1-S4 in cylindrical metal holder 12. In the embodiment shown, there are five optical elements. There may be more or less than five in other embodiments depending on the system requirements. The window of wavelength with which the stack may operate may range from infrared to visible. Retaining ring 14 may be positioned on the end of the stack of optical elements to secure the stack. In the context of the present disclosure, optical lens stack 10 is designed for use in a smart optical seeker system where smart is defined as any method or device having both sensing and control capabilities.

Optical lens stack 10 further include piezoelectric cylinder 16 attached to and surrounding metal holder 12 and attached to a control system and power supply and cylindrical accelerometer 18 surrounding piezoelectric cylinder 16 attached to a control system and power supply. In an embodiment, accelerometer 18 may be a piezoresistive accelerometer attached to a control system and power supply and attached to piezoelectric cylinder 16. In another embodiment piezoelectric cylinder may be an accelerometer and an actuator. In other embodiments, other accelerometers known in the art may be utilized. During launch of a munition, a signal from accelerometer 18 is sent through electrical connections, not shown, to a central control system and power supply, where the signal is inverted and sent to piezoelectric cylinder 16. The mechanical response of piezoelectric cylinder 16 counteracts the deformation of metal cylinder 12 during launch, and nulls the high frequency vibration of the optical stack, thereby minimizing or preventing fracture of optical elements E1-E5 in metal holder 12 during a launch.

Figure 2:
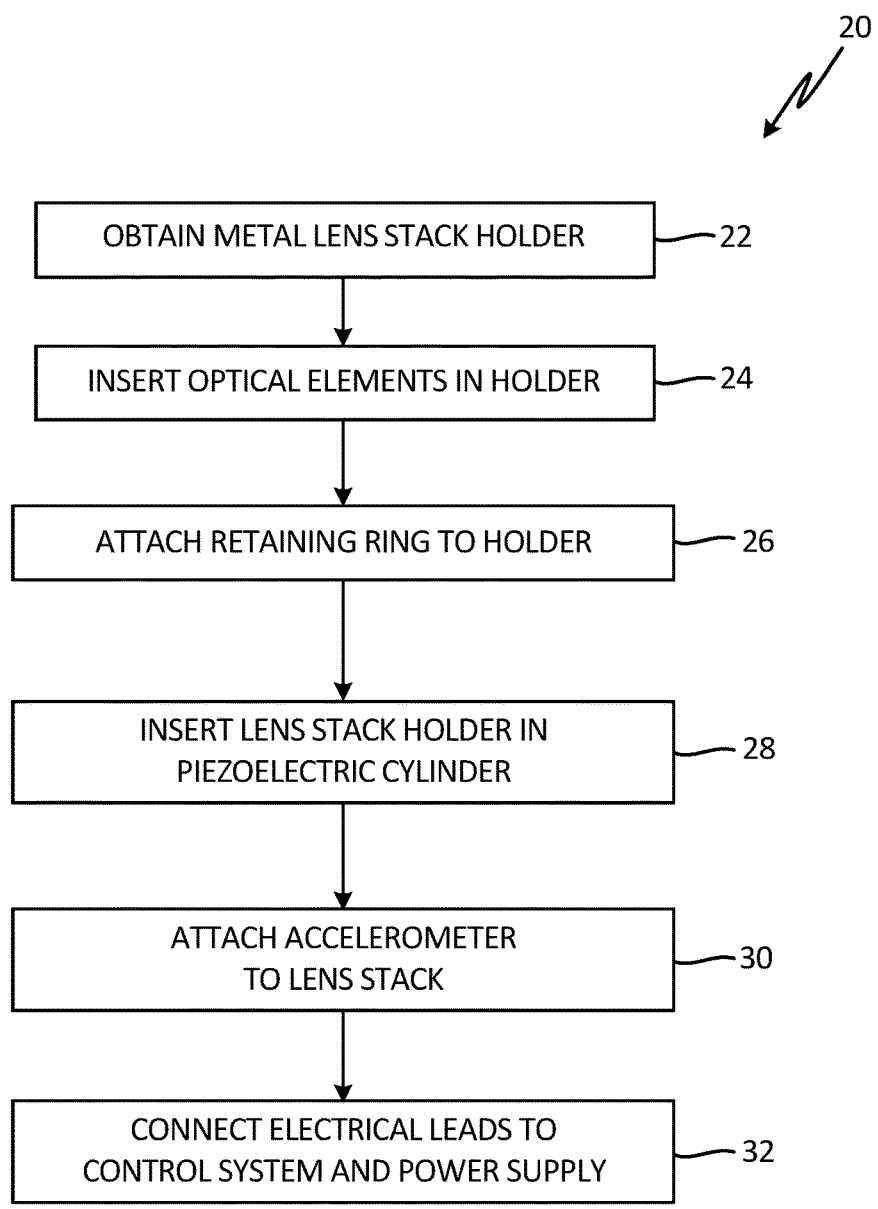
FIG. 2 is a flow diagram of a method of forming an optical system according to the present disclosure.

FIG. 2 is a flow diagram of a method of forming optical lens stack 10. In the first step of method 20, metal lens stack holder 12 is formed (Step 22). Optical elements E1-E5 and spacers S1-S4 are then inserted in metal holder 12 (Step 24). The lens stack is then inserted in piezoelectric cylinder 16 and secured to piezoelectric cylinder 16 by epoxy or other adhesives (Step 30). Accelerometer 18 is then attached to piezoelectric cylinder 12 (Step 32). In an embodiment, the accelerometer may be a cylindrical piezoresistive accelerometer. In another embodiment the accelerometer may be a sheer stress film sensor. In another embodiment, piezoelectric cylinder 16 may be an accelerometer and an actuator. Other accelerometers known in the art may be utilized.

Electrical leads of the accelerometer and piezoelectric cylinder are then connected to a central control system and power supply. During launch of a munition, a signal from accelerometer 18 is sent through the electrical connections to a central control system and power supply where the signal is inverted and sent to piezoelectric cylinder 16. The mechanical response of piezoelectric cylinder 16 counteracts the deformation caused by launch and flight accelerations of metal holder 12 and nulls the high frequency vibration of the optical stack thereby minimizing or preventing fracture of optical elements E1-E5 in metal holder 12 during a launch.

DISCUSSION OF POSSIBLE EMBODIMENTS

The following are non-exclusive descriptions of possible embodiments of the present invention.

An optical system configured to counteract vibration due to a munition launch may include a cylindrical optical lens stack and an accelerometer attached to the lens stack and connected to a control system and power supply. The system may also include a mechanical actuator attached to the lens stack and connected to a control system and power supply and a control system and power supply.

The system of the preceding paragraph can optionally include, additionally and/or alternatively, any one or more of the following features, configurations and/or additional components:

The accelerometer may be a piezoresistive accelerometer.

The mechanical actuator may be a piezoelectric cylinder attached to and surrounding the lens tack.

The accelerometer may be a sheer stress film sensor on the outside surface of the piezoelectric actuator.

The accelerometer may be the piezoelectric accelerometer.

In operation a signal from the piezoresistive accelerometer may be inverted and amplified by the control system and sent to the mechanical actuator to counteract deformation caused by the munition launch and flight accelerations to minimize deformation of the optical lens stack.

During operation a signal from the sheer stress film sensor may be inverted and amplified and sent to the mechanical actuator to counteract deformation caused by the munition launch and flight accelerations to minimize deformation of the lens stack.

During operation a signal from the piezoelectric cylinder may be inverted and amplified and used to actuate the piezoelectric cylinder to minimize deformation caused by launch and flight accelerations of the lens stack.

The optical lens may operate at wavelengths from infrared to visible.

The system may be included in a missile seeker system.

A method of forming an optical system configured to counteract vibration due to a munition launch may include forming a multi-lens cylindrical optical lens stack in a cylindrical holder and inserting the lens stack in a cylindrical mechanical actuator and connecting the actuator to a control system and power supply. The method may further include attaching an accelerometer to the lens stack and connecting the accelerometer to a control system and power supply.

The method of the preceding paragraph can optionally include, additionally and/or alternatively, any one or more of the following features, configurations and/or additional components.

The accelerometer may be a piezoelectric accelerometer.
The accelerometer may be a piezoresistive accelerometer.
The accelerometer may be a sheer stress film sensor.
The accelerometer may be the piezoelectric cylinder.

In operation a signal from the piezoelectric accelerometer may be inverted and amplified by the control system and sent to the piezoelectric cylinder to counteract deformation caused by launch and flight accelerations to minimize deformation of the optical lens stack.

In operation a signal from the piezoresistive accelerometer may be inverted and amplified by the control system and sent to the piezoelectric cylinder to counteract deformation caused by launch and flight accelerations to minimize deformation of the optical lens stack.

In operation a signal from the sheer stress film sensor may be inverted and amplified by the control system and sent to the piezoelectric cylinder to counteract deformation caused by launch and accelerations to minimize deformation of the optical stack.

In operation a signal from the piezoelectric cylinder may be inverted and amplified and used to actuate the piezoelectric cylinder to counteract deformation caused by launch and flight accelerations to minimize deformation of the optical lens stack.

The optical system may be included in a missile seeker system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An optical system configured to counteract deformation and/or vibration due to a munition launch and/or flight acceleration, the system comprising:
    a power supply;
    a control system;
    a cylindrical optical lens stack;
    a cylindrical holder attached to and surrounding the optical lens stack;
    a piezoelectric cylinder attached to and surrounding the cylindrical holder and connected to both the control system and the power supply,
    wherein the control system actuates the piezoelectric cylinder to counteract the deformation and/or the vibration of the optical lens stack caused by the munition launch and/or the flight acceleration.

2. The system of claim 1, wherein the piezoelectric cylinder comprises an accelerometer.

3. The system of claim 1, wherein the piezoelectric cylinder comprises a mechanical actuator.

4. The system of claim 2, wherein the accelerometer has a sheer stress film sensor on an outside surface of the accelerometer.

5. The system of claim 2, wherein the accelerometer is a piezoresistive accelerometer.

6. The system of claim 1, wherein the piezoelectric cylinder comprises both an accelerometer and a mechanical actuator.

7. The system of claim 3, further comprising:
    a cylindrical accelerometer attached to and surrounding the piezoelectric cylinder.

8. The system of claim 7, wherein the control system actuates the piezoelectric cylinder based on signals received from the cylindrical accelerometer so as to actuate the piezoelectric cylinder to counteract the deformation and/or vibration of the optical lens stack caused by the munition launch and/or the flight accelerations.

9. The system of claim 1, wherein the optical lens stack operates at wavelengths from infrared to visible.

10. The system of claim 1, wherein the system is included in a missile seeker system.

11. A method of forming an optical system configured to counteract deformation and/or vibration due to a munition launch and/or flight accelerations, the method comprising:
    forming a multi-lens cylindrical optical lens stack in a cylindrical holder;
    inserting the optical lens stack in a piezoelectric cylinder
    connecting the piezoelectric cylinder to both a control system and a power supply;
    actuating, via the control system, the piezoelectric cylinder to counteract the deformation and/or the vibration of the optical lens stack caused by the munition launch and/or the flight accelerations.

12. The method of claim 11, further comprising:
    sensing vibrations with an accelerometer.

13. The method of claim 12, wherein the accelerometer is a piezoresistive accelerometer.

14. The method of claim 12, wherein the accelerometer is a sheer stress film sensor.

15. The method of claim 12, wherein the accelerometer is the piezoelectric cylinder.

16. The method of claim 12, further comprising:
generating a signal by the accelerometer, wherein actuating, via the control system, of the piezoelectric cylinder is based on the signal generated by the accelerometer.

17. The method of claim 13 wherein a signal from the piezoresistive accelerometer is inverted and amplified by the control system and sent to the piezoelectric cylinder to counteract the deformation and/or the vibration of the optical lens stack caused by the munition launch and/or the flight accelerations to minimize deformation of the optical lens stack.

18. The method of claim 14, wherein a signal from the sheer stress film sensor is inverted and amplified by the control system and sent to the piezoelectric cylinder to counteract the deformation and/or the vibration of the optical lens stack caused by the munition launch and/or the flight accelerations to minimize deformation of the optical stack.

19. The method of claim 11, wherein a signal from the piezoelectric cylinder is inverted and amplified and used to actuate the piezoelectric cylinder to counteract the deformation and/or the vibration of the optical lens stack caused by the munition launch and/or the flight accelerations to minimize deformation of the optical lens stack.

20. The method of claim 11, wherein the optical system is included in a missile seeker system.

* * * * *